United States Patent [19]

Iizuka et al.

[11] Patent Number: 4,779,201
[45] Date of Patent: Oct. 18, 1988

[54] BOREHOLE SCANNER AND SONDE POSITION LOCATOR FOR SPECTRAL ANALYSIS OF WALL

[75] Inventors: Yunosuke Iizuka; Takashi Ishii, both of Kyobashi; Yoshitaka Matsumoto, Yokohama; Koji Noguchi, Tokyo, all of Japan

[73] Assignees: Shimizu Construction Co., Ltd.; Core Inc., both of Tokyo, Japan

[21] Appl. No.: 887,400

[22] Filed: Jul. 21, 1986

[30] Foreign Application Priority Data

Jul. 22, 1985 [JP] Japan .................. 60-161378

[51] Int. Cl.$^4$ ............... G02B 23/24; G01N 21/88; E21B 49/00; G01J 3/51
[52] U.S. Cl. ....................... 364/422; 73/151; 324/338
[58] Field of Search .............. 73/151; 367/33, 86, 367/128; 364/422; 33/313; 324/338

[56] References Cited

U.S. PATENT DOCUMENTS

| | | | |
|---|---|---|---|
| 4,082,950 | 4/1978 | Chen | 250/343 |
| 4,145,914 | 3/1979 | Newman | 73/290 V |
| 4,234,942 | 11/1980 | Prause et al. | 367/128 |
| 4,247,922 | 1/1981 | Jackson | 367/128 |
| 4,266,878 | 5/1981 | Auer | 356/419 |
| 4,399,692 | 8/1983 | Hulsing, III et al. | 73/151 |
| 4,411,519 | 10/1983 | Tagami | 356/45 |
| 4,459,759 | 7/1984 | Hulsing, II | 33/304 |
| 4,556,884 | 12/1985 | Howells et al. | 367/33 X |
| 4,601,024 | 7/1986 | Broding | 367/86 |
| 4,638,872 | 1/1987 | Park et al. | 175/46 |

FOREIGN PATENT DOCUMENTS

| | | | |
|---|---|---|---|
| 3149256 | 6/1983 | Fed. Rep. of Germany | 367/128 |
| 0092877 | 6/1983 | Japan | 367/128 |
| 0223113 | 12/1983 | Japan | |
| 0125003 | 7/1984 | Japan | |

OTHER PUBLICATIONS

Van Schalkwyk, A., "Rock Engineering Testing in Exploratory Boreholes", Proceedings of the Symposium on Exploration of Rock Engineering, Johannesburg, Nov. 1976, 37-55.

Primary Examiner—Jerry Smith
Assistant Examiner—Clark A. Jablon
Attorney, Agent, or Firm—Armstrong, Nikaido, Marmelstein & Kubovcik

[57] ABSTRACT

An optical head (12) is rotated while a sonde (11) is moved up or down within a bore hole (22), and a beam of light from a light source (22) is projected toward the wall of the bore hole (22) via a lens (21), slit (22), half-mirror (19), mirror (15) and lens (14). Light reflected from the bore hole wall is extracted from the half-mirror (19) via a slit (17) and a photoelectric transducer (18) so that the bore hole wall may be continuously observed. By separating the reflected light into spectral components and processing them, color tone logging and other observations can be performed. The orientation of the sonde (11) is sensed by an azimuth finder (23) and rotation gauge (24), and the inclination of the sonde (11) is sensed by a dipmeter (25). Displacement of the sonde accompanying each unit length of up-or-down movement of the sonde (11) is calculated and the displacements are integrated to obtain the position being observed by the sonde.

25 Claims, 13 Drawing Sheets

Fig. 21
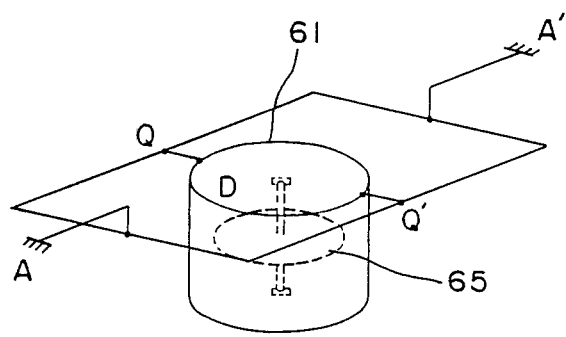
Fig. 22(A)  Fig. 22(B)
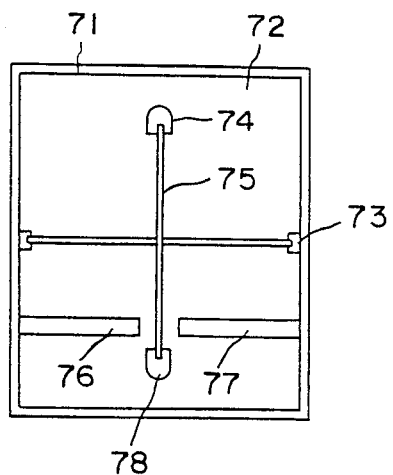 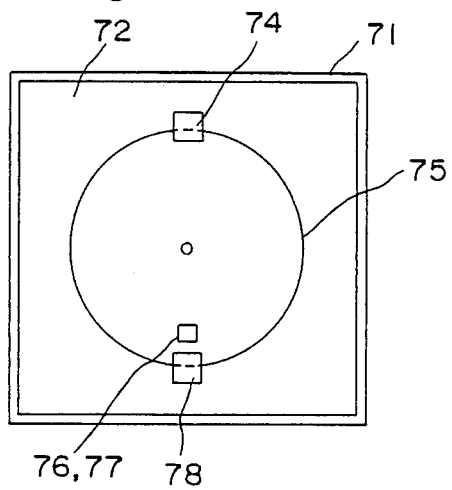
Fig. 23
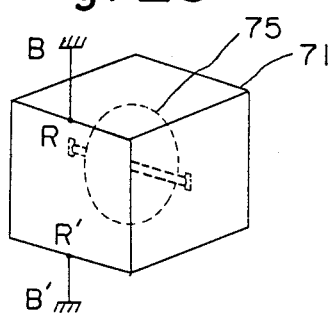

BOREHOLE SCANNER AND SONDE POSITION LOCATOR FOR SPECTRAL ANALYSIS OF WALL

BACKGROUND OF THE INVENTION

This invention relates to a method and apparatus for observing bore holes such as boring holes and pipe holes.

In drilling underground cavities for dams, tunnels and the like, a geological survey is performed at the site and the results of the survey are reflected in the design drawings. It is also necessary to select the method of executing the project and to assure perfection in terms of how the project proceeds, project safety measures and the like.

In a geological survey, it is generally necessary to ascertain the direction, inclination of rock joint and properties of the rock, as well as strike and dip of the bed. One method of performing such a survey is to bore a hole at the site and sample the core in order to observe its nature. Another method is to bore a hole at the site and make a direct observation of the bore hole wall.

Bed formations exhibit a variety of different colors depending upon the type of rock and the degree to which the rock has weathered. For example, granite in fresh rock is white or blue-white in color but changes to yellow and then to brown as weathering progresses.

In the first method of geological surveying that relies upon the direct observation method, an engineer will pass judgment on the type and category of rock by observing, with the naked eye, rock and exposed rock surfaces to check for the color variations mentioned above, and by examining rock hardness using a hammer tapping method. The results of these tests are recorded. In a boring survey, the results are usually recorded in a boring logging.

An example of a boring log is illustrated in FIG. 1. As shown, the results recorded include the name of the bed formation, color tone, core sampling rate and RQD, as well as the results of electrical logging, temperature logging and sonic logging. The core sampling rate and RQD are indicated in terms of curves expressing the percentage (%) of the core per one length of penetration, and the electrical, temperature and sonic surveys are indicated by the curves or broken lines expressing $\rho(\Omega-m)$, $T(°C.)$ and $V(Km/sec)$, respectively. For the names of the bed formations and soil nature, detailed category tables are used regarding soil category and rock.

As for color tone, however, measures regarding methods of expression and measurement have not yet been firmly established, and color tones that can serve as criteria for judgment of color following weathering cannot be discriminated objectively when observation is performed by the naked eye. Consequently, color tone is judged and recorded based on the subjectivity of the engineer. Accordingly, even if a bed of one and the same color is observed and the color recorded in a table, it is rare for the same expression to be used by different engineers because of the difference among individuals. This results in the use of subjective expressions and the use of a variety of different color names. Moreover, it is impossible to reproduce a color based merely on a written entry.

Even if data from examination of soil quality and underground water are obtained by performing electrical logging and sonic logging in the boring hole and sampling objective data continuously in the direction of bore depth, therefore, it is not possible to put these data into the form of continuous numerical values with regard to color tone.

In conducting boring investigations, moreover, the boring core must be extracted and brought above ground in order to be observed. In doing so, a core that has undergone severe weathering tends to crumble so that portions thereof cannot be observed, and data indicative of the core constitution cannot be sampled in a continuous manner; instead, the data obtained is the mean of values obtained from individual layers.

In the second method of geological surveying that entails direct observation of the bore hole wall, observation of the bore hole wall.

A bore hole television is a compact color television camera suspended from cables and lowered into the bore hole so that the bore hole wall can be viewed on a television monitor above ground. Since a bore hole television has an angle of view of about 30°, the entire periphery of the bore hole wall is observed by rotating a mirror mounted on the front end of the camera. When performing an analysis of the wall, the wall is photographed one frame at a time by the television camera and the frames are assembled into an expanded picture, as illustrated in FIG. 2. In order to obtain a record of these pictures, they are recorded using an VTR. Compass direction is indicated in the picture in the form of an angle of rotation from due north.

A bore hole periscope is a periscope inserted into the bore hole and includes a head comprising an objective lens and a reflector. A pipe is connected to the head and permits one to observe the bore hole wall above ground by looking into an eyepiece lens. Like the bore hole camera, the bore hole periscope has an angle of view of about 30°. In order to observe the entire periphery of the wall, the observer must rotate the entire periscope from above ground. Recording pictures using such a periscope entails mounting a camera on the eyepiece portion thereof and photographing the necessary areas of the wall. Compass direction is ascertained by attaching a magnet to the eyepiece portion of the periscope and reading the position of a needle by the naked eye.

A bore hole camera includes a head accommodating a panoramic camera. The head is suspended from cables and lowered into the bore hole to take expanded pictures of certain sections of the bore hole wall. These pictures are recovered and reproduced on film to obtain an expanded picture. The width of an expanded picture taken by one revolution of the bore hole camera is 1 to 1.5 cm, so that about a 50 cm section of the wall can be photographed on a single roll of film. To acquire a succession of expanded pictures, therefore, the pictures having the width of 1 to 1.5 cm must be assembled vertically. Compass direction is indicated by reproducing the direction of due north on the film.

A bore hole scanner includes an optical head and a photoelectric transducer. While being rotated, the optical head projects a light beam onto the bore hole wall. Light reflected from the wall is received by the photoelectric transducer, which proceeds to convert the reflected light into an electric signal. An expanded picture is obtained from the direction of the projected light beam and the depth of the scanner.

In order to ascertain the direction and dip of cracks and of the bed formation, it is preferred in terms of accuracy and efficiency that an expanded picture be produced and that this be observed in its entirety. With the conventional bore hole television and bore hole periscope, however, all of the pictures taken cannot be observed in a single viewing. Accordingly, the pictures must be assembled by being pasted together, as shown in FIG. 2, in order to obtain the expanded picture. This requires a considerable amount of labor. The bore hole camera, on the other hand, allows a picture of the entire bore hole periphery to be obtained in a comparatively simple manner. However, only about a 50 cm section can be measured at a time and the head must be lifted out of the bore hole and then reinserted whenever the film is replaced. In addition, since the quality of the expanded picture cannot be verified without first developing the film, judgment of picture quality cannot be made at the site. If a usable picture fails to be obtained, it is necessary to return to the site and repeat photography.

Among the items of equipment mentioned so far, the bore hole scanner is best in that an expanded picture can be acquired at the time the measurement is taken. Still, a disadvantage with this expedient is that a hard copy of the overall expanded picture cannot be obtained with a display device of this kind.

When conducting a geological survey by lowering number of revolutions of a pulley used for depth measurement. Measurement of depth by relying upon such a pulley is prone to error owing, for example, to pulley slippage.

To correct for errors ascribable to factors such as pulley slippage, one method adopted is to affix markers to the lowering cable at fixed intervals along its length. In surveys of structures related to civil engineering, depths reach down to some 300 meters. With the above-mentioned marker method, depth can be determined to within a measured precision of ±1 meter. This will provide values which, by and large, are accurate enough for use in constructing structures of the above type. Recently, however, the need has arisen for investigative borings in civil engineering works involving depths of 1000 to 1500 meters. For depths of the 1000-meter class, the aforementioned conventional approaches involve considerable difficultly in terms of accuracy. Specifically, since the cables used stretch due to their own weight, it becomes impossible to ascertain depth in a precise manner where the deeper bore holes are concerned.

At larger boring lengths, there are occasions where the hole is drilled while developing an irregular curve. This can be caused by crushed rock fragements becoming lodged in the vicinity of the drill bit, by differences in drilling resistance when drilling obliquely through bed interfaces having different hardnesses, or by deviations in the deformation characteristic of the boring rod material. This leads to a problem wherein the geological information obtained by boring represents neither the correct coordinates nor the correct direction. In order to reduce the cost of boring oil and geothermal wells, moreover, the boring tip is pointed in a number of different directions by curving the hole artificially in mid-course from a single entrance. In this case also it is necessary that hole curvature be accurately measured.

One example of measuring bore hole curvature is to lock a gyrobalancer, to which a magnetic rotary body is attached, at an observation position. Other systems for measuring bore hole curvature include a so-called "toropari" for taking pictures, a dipmeter in which a weighed needle is lowered onto a recording paper, which is rotated by a magnetic system, in order to perforate or mark the paper so that dip can be ascertained, or a gyro that traces hole curvature by a tridirectional gyro. All of these conventional systems have problems, however. For example, with the system using the "toropari" or dipmeter, data can be acquired neither continuously nor instantaneously. The gyro system is not only costly but also places a limitation upon speed at measurement in order to improve precision. The gyro must also be calibrated with each use.

SUMMARY OF THE INVENTION

The present invention is based on the above-described considerations and an object thereof is to provide a bore hole observation system capable of obtaining objective investigative data relating to color, as well as an expanded picture which is correlated with accurately determined observation positions.

Another object of the invention is to make it possible to distinguish among the color tones of a geological formation under observation.

Still another object of the invention is to provide a bore hole observation system in which it is possible to produce a hard copy of a continuous expanded picture in the depth direction of a boring hole from a picture signal obtained by using a bore hole scanner.

A further object of the invention is to provide a bore hole observation system in which, irrespective of the inclination of a sonde incorporating a scanner, the direction in which a scanner head is pointing is calculated and accurate positions along a bore hole wall can be determined continuously during observation even if the the hole is inclined.

A further object of the invention is to provide a bore hole observation system in which data can be obtained continuously and the status thereof verified rapidly.

A further object of the invention is to provide a bore hole observation system in which depth can be measured accurately even in deep boring holes.

According to the present invention, the foregoing objects are attained by providing a method and apparatus for observing a bore hole, in which the wall of the bore hole is observed by using a sonde moved up and down within the bore hole. The apparatus includes light projecting means for projecting a light beam toward the bore hole wall, received light processing means for separating light reflected from the bore hole wall into a spectra and converting the spectra into electric signals, position sensing means for sensing observation positions, and data processing control means for implementing overall control of the apparatus and for processing observation information obtained by conversion into electric signals.

According to the invention, the method implemented by the above apparatus includes the steps of projecting the beam of light toward the bore hole wall from a light source within the sonde, separating the light reflected from the bore hole wall into spectra, and converting the spectra into electric signals, while the position irradiated by the light beam is measured, and outputting observation information indicative of the bore wall upon correlating the irradiated positions and electric signals.

With the bore hole observation method and apparatus described above, geological survey information based on accurately measured observation positibns can be obtained, and an expanded picture based on this information can also be obtained with ease. In addition, observations based on color tone can be carried out using the spectrum data so that the properties of rock useful in engineering terms can be ascertained.

Other features and advantages of the present invention will be apparent from the following description taken in conjunction with the accompanying drawings, in which like reference characters designate the same or similar parts throughout the Figures thereof.

BRIEF DESCRIPTION OF THE DRAWINGS

FIG. 21 is a view showing an example of the manner in which the azimuth compass of FIG. 20 is mounted;

FIGS. 22(A), (B) are views illustrating an example of a dipmeter used in the present invention;

FIG. 23 is a view showing an example of the manner in which the dipmeter of FIG. 22 is attached.

DESCRIPTION OF THE PREFERRED EMBODIMENT

A preferred embodiment of the invention will now be described with reference to the drawings.

According to the invention, a sonde is up or down within a bore hole by using a hoist. Incorporated within the sonde as bore hole observing means are means for projecting a beam of light toward the bore hole wall and observing the intensity of the reflected light, and means for accurately sensing the position observed. Outputted as observation data are the color tones and an expanded picture of the wall surface, the direction, dip and nature of cracks in the rock at the wall surface, and other important geological survey data. The corresponding observed positions can also be specified.

Let us begin by describing an example of the basic construction of a sonde for observing the color tone of a bore hole wall surface.

Figure 3:
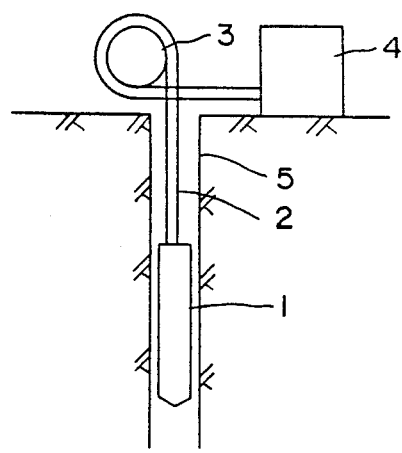
FIG. 3 is a view illustrating the state of a sonde in use when the sonde is employed in a geological survey performed in a bore hole.

As shown in FIG. 3, the sonde, indicated at numeral 1, is connected to one end of a cable 2 for lowering the sonde into a bore hole 5. The cable 2 is operated by a hoist 3 and has its other end connected to a recording device 4 for recording various data.

Figure 4:
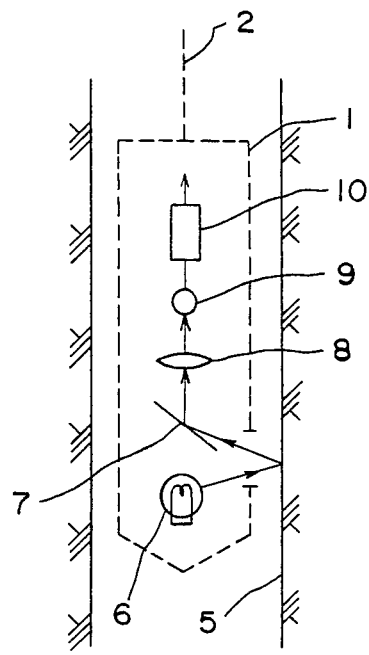
FIG. 4 is a view illustrating an exemplary basic arrangement of a sonde when used to log color tone.

If color tone is to be logged, the sonde 1 is provided internally with a light source 6, a reflector 7, a lens 8, a device 9 for spectroscopy, and a signal converter 10, as shown in FIG. 4. The sonde 1 incorporating this equipment is lowered into the bore hole 5 by the cable 2 and hoist 3. A light beam emitted from the light source 6 within the sonde 1 is reflected at the wall surface of the hole 5 and is received by the reflector 7, which proceeds to redirect the light along the axis of the sonde 1 so that the lens 8 may form an image of a focal point on the spectroscopic device 9. The latter separates the light into a spectrum. Since the spectrum obtained will be the result of absorption and reflection, which in turn depend upon the colors of the geological formations exposed at the bore hole wall, the reflected intensity will differ. The spectrum is converted into electric signals by the spectroscopic device 9 and signal converter 10, the latter transmitting the signals to the recorder 4 located externally of the sonde 1. The recorder 4 processes these signals and records them.

The spectrum provided by the device 9 is calibrated by a standard color, such as standard white. The R (red), G (green) and B (blue) colors of the spectrum are then extracted. Standard values of these three spectral colors, as they are or after being stored in memory in advance, are compared with the sensed signal strength and the resulting deviation values are combined to specify color. The color so specified leaves no room for subjective interpretation based on individual differences among the observers and is expressed by the same results regardless of how many observers perform the analysis. This makes it possible to judge the nature of a geological formation using a common standard.

Figure 5:
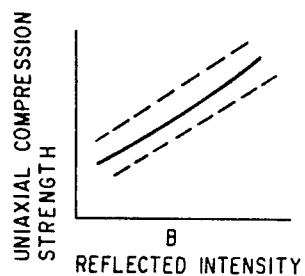
FIG. 5 is a view illustrating the correlation between refrected intensity of blue, red and green and various characteristics when analyzing a geological formation.
Figure 5:
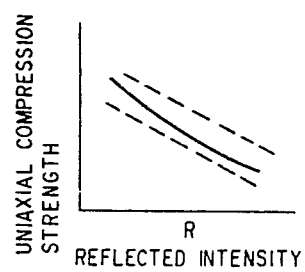
Figure 5:
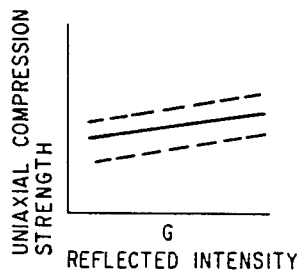
Figure 5:
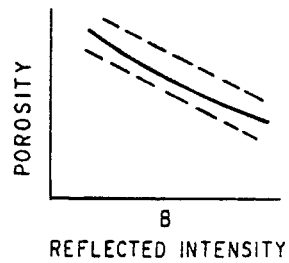
Figure 5:
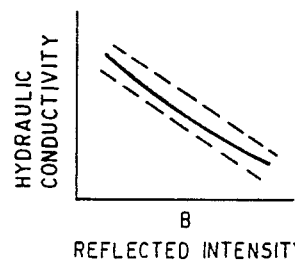
Figure 5:
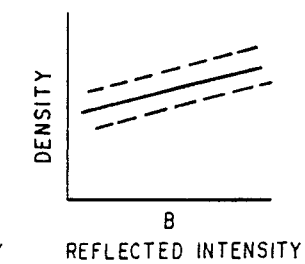

The invention is not limited to the above-described arrangement in which a comparison is made with the standard values to express color. It is also possible to output each of the three spectral colors individually and use them in analyzing the nature of the geology. More specifically, and by way of example, assume that a correlation has been ascertained between each of the spectral colors for granite and uniaxial compression strength, density, hydraulic conductivity and porosity, as shown in FIG. 5. If the intensity of each spectral color is known, then the respective standard values can be immediately obtained.

Figure 1:
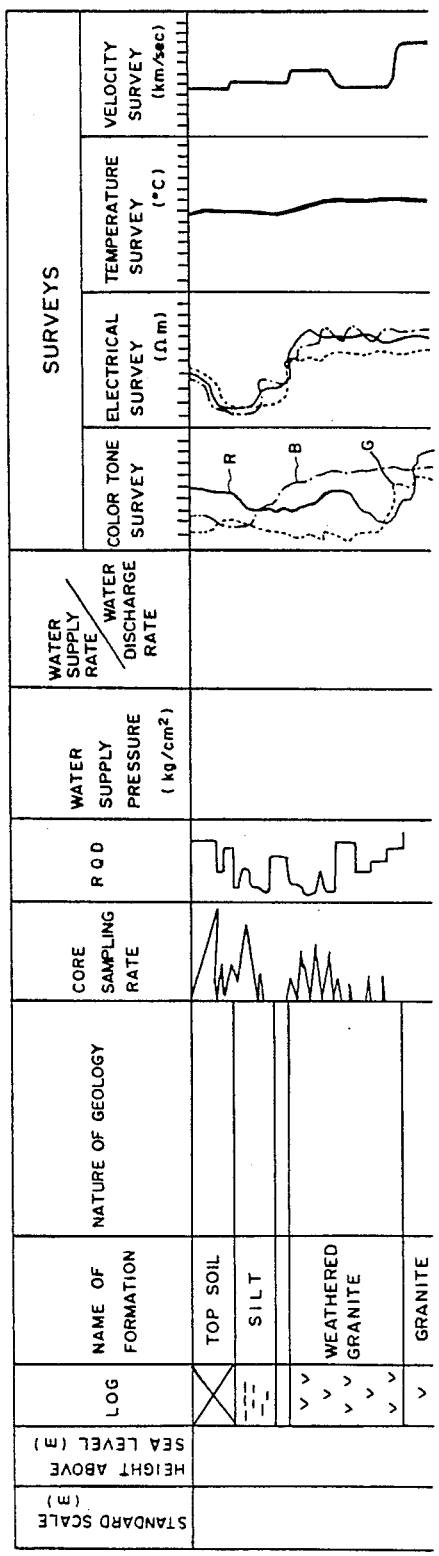
FIG. 1 shows a boring log on which color tone is logged.
Figure 2:
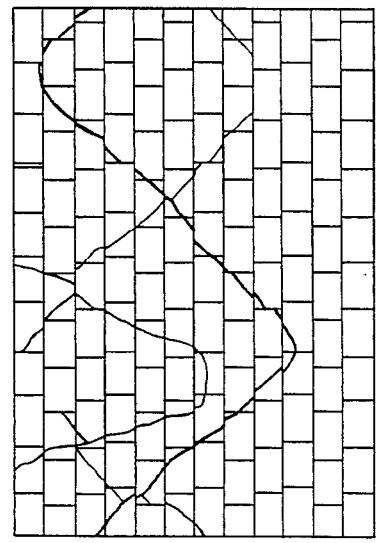
FIG. 2 is a view showing an expanded picture obtained by pasting together a plurality of photographs.

If the three spectral colors are recorded in a boring log, as shown in FIG. 1, then successive values corresponding to depth can be obtained. This will make it possible to provide a completely furnished boring log unlike the boring logs of the prior art.

Next, let us give a detailed description of a correlation between granite color tone and degree of weathering based on an example in which nine different types of granite samples are extracted and investigated.

Figure 6:
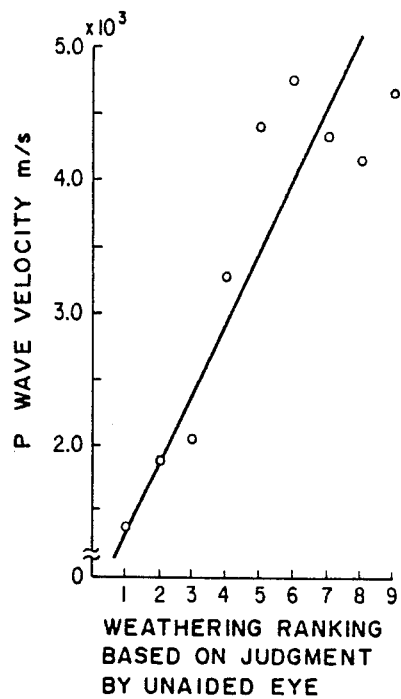
FIG. 6 is a view illustrating the relationship between weathering ranking and P-wave velocity based on a judgment that relies upon the naked eye.

Nine types of granite samples were ranked in terms of degree of weathering, which was judged by the naked eye. Properties observed included color, weight, hammer recoil and sound produced by striking with a hammer. The relationship between the degree of weathering and the chemical and physical characteristics of the rock samples was examined and it was found that the two agree. In other words, the engineering properties of the rock which need to be known when surveying and designing rock structures were found to correlate closely with the degree of rock weathering judged by a geologist with the unaided eye. The chemical characteristic mentioned is the WPI value obtained by calculation based on quantitative analysis of potassium, sodium, magnesium, calcium, silicon, aluminum, iron, titanium and all components of the water of crystallization of the rock. The physical characteristics include the porosity of the rock, elastic wave velocity of the rock [P waves (longitudinal waves), S waves (transverse waves)] and the tensile strength of the rock. It should be noted that the WPI value relates to a method of expressing, in terms of chemical composition, the state of change of rock caused by weathering. The value is expressed as follows:

WPI value = $B/A$ where
$A = SiO_2 + Al_2O_3 + Fe_2O_3 + FeO + TiO_2 + CaO + MgO + Na_2O + K_2O$
$B = 100 (K_2O + Na_2O + MgO + + CaO - H_2O^+)$ The correlation between P-wave velocity and weathering ranking based on judgment by the naked eye is illustrated in FIG. 6.

Figure 7:
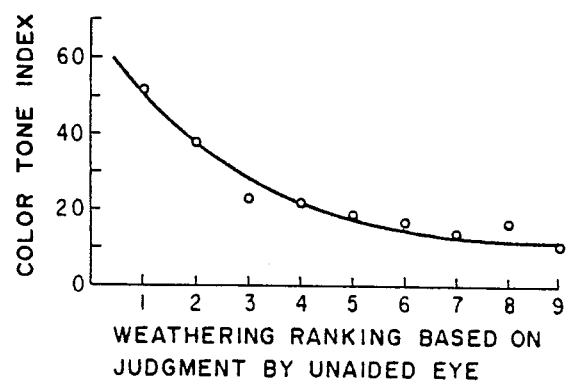
FIG. 7 is a view illustrating the relationship between weathering ranking and a color tone index based on a judgment that relies upon the naked eye.
Figure 8:
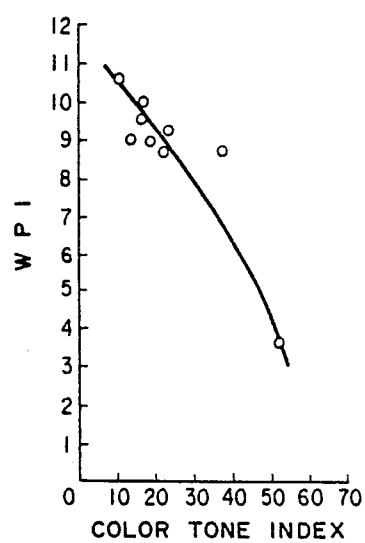
FIG. 8 is a view showing the relationship between a color tone index and WPI (a chemical characteristic)
Figure 9:
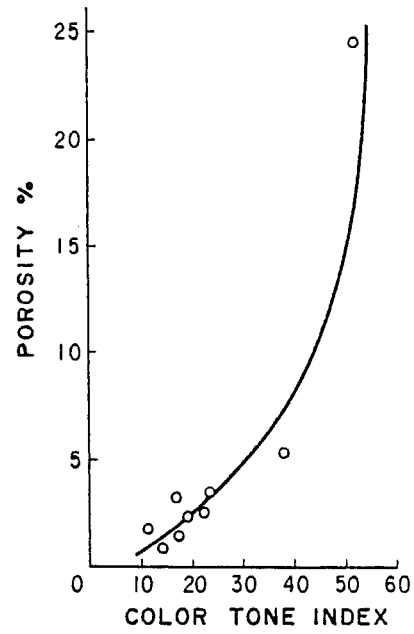
FIG. 9 is a view showing the relationship between a color tone index and porosity.
Figure 10:
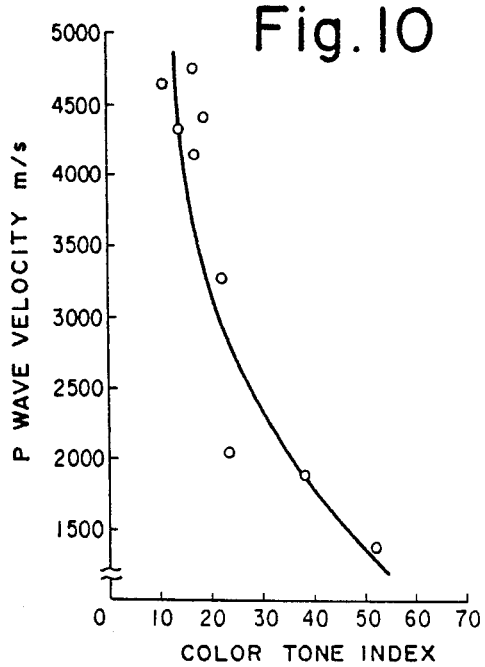
FIG. 10 is a view showing the relationship between a color tone index and P-wave velocity.
Figure 11:
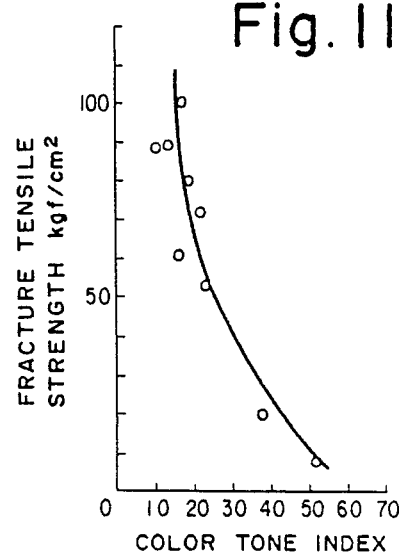
FIG. 11 is a view showing the relationship between a color tone index and tensile strength.

Next, the nine types of granite samples were photographed using a color television camera, the pictures were converted into 131 dot×131 dot digital picture data, the intensity of the colors R, G, B of all the pixels (about 17,000 dots) was measured and the results were subjected to processing to obtain color tone indices. It was found that the serial ranking of the color tone data and the weathering ranking judged by the naked eye are mutually related in the manner shown in FIG. 7. Correlations of the kind shown in FIGS. 8 through 11 were found from the two correlations involving the above-mentioned chemical and physical characteristics (FIG. 6) and color tone characteristic (FIG. 7). Specifically, it will be appreciated that based on these correlations, the degree of weathering and the engineering properties of the rock can be evaluated by measurement of color tone.

The embodiment described is for a case where a sonde is used in a boring hole. If the geology is to be investigated at the surface, color or spectral intensity can be outputted and displayed in a simple manner merely by projecting a light beam from the sonde into the core that is to be observed.

As described in detail hereinabove, the following advantages can be expected by using a color tone observation sonde in accordance with the invention:

(A) Color tone can be measured quantitatively by instrumentation. Such measurement provides standardized data of an objective nature, irrespective of who makes the measurement. Such data are very useful in judging geological formations.

(B) The color tone of a geological formation can be discussed and understood by all on a common footing.

(C) A sonde lowered into a bore hole permits direct observation of the bore hole wall and enables image processing or spectral analysis above ground. This has the following results:

(a) Color tone data can be acquired even with regard to bore hole walls having heavily weathered, soft portions.

(b) Boring surveys are feasible using a non-core boring technique rather than the costly core boring method.

(c) Since color tone data can be acquired in the form of detailed data varying continuously depthwise of the bore hole, the precision of geological determinations is improved.

(d) Fully instrumented automatic measurement and data processing are possible, electrical logging, acoustic wave velocity logging and color tone logging can all be performed within the boring hole and objective data that are continuous depthwise of the hole can be obtained, thereby enabling geological surveys and groundwater surveys to be conducted in a shorter period of time.

(e) A complete boring logging of results can be provided.

Described next will be an exemplary basic construction of a sonde capable of scanning a bore hole wall surface and of providing an expanded picture of the wall surface correlated with the observed positions.

Figure 12:
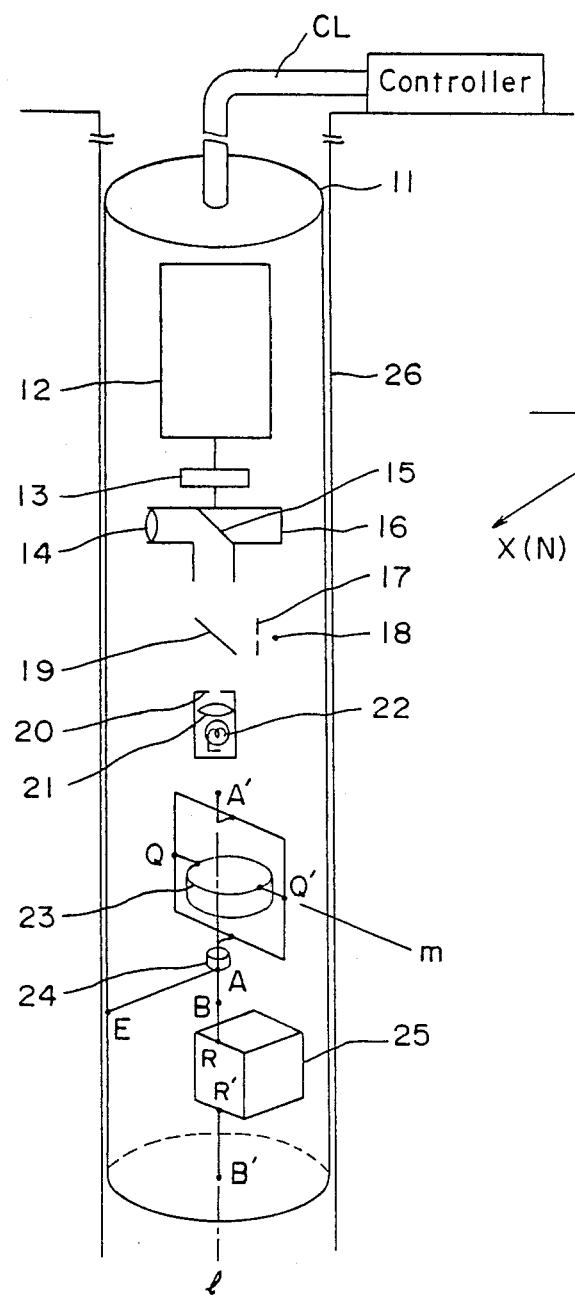
FIG. 12 is a view illustrating an exemplary basic construction of a sonde equipped with means for observing the wall of a bore hole and means for sensing the observed position.

In FIG. 12, a sonde, which is indicated at numeral 11, comprises an observation section moved up or down within a bore hole 26 and adapted to project a light beam toward the hole surface and measure the intensity of the reflected light, and a position sensing section for accurately sensing the positions being observed.

The observation section includes an optical head 16 coupled to a swiveling motor 12 and having a direction finder 13, a lens 14 and a mirror 15. Also provided are a light source 22 for transmitting a light beam toward the optical head 16 through a half-mirror 19, a slit 20 and a lens 21 for forming the light beam, and a slit 17 and photoelectric transducer 18 for sensing the light beam from the optical head 16 after the beam has been reflected at the bore wall surface. With an arrangement of this type, the light from the light source 22 is shaped into a beam by the slit 20 and lens 21, and the resulting light beam is projected toward the bore hole wall via the half-mirror 19, mirror 15 and lens 14. The intensity of the light beam reflected from the bore wall surface is measured by the photoelectric transducer 18 via the lens 14, mirror 15, half-mirror 19 and slit 17. While the optical head 16 is being swiveled by the swiveling motor 12, the sonde 11 is lowered within the bore hole, thereby scanning its wall surface. An electric signal corresponding to the intensity of the reflected light beam is produced by the photoelectric transducer 18.

The above observation of the bore wall surface by the observation section is performed while verifying direction, by means of the internal direction finder 13, from a reference position of the sonde 11 when the reference position is pointing in a fixed direction. However, if solely the direction finder 13 is relied upon, the bore hole is required to be perfectly vertical. If the bore hole is non-vertical, then a pronounced decline in observation precision can be expected. For this reason, the position sensing section is provided and is used in order to precisely ascertain the observed position even if the bore hole is non-vertical or curved.

Figure 20:
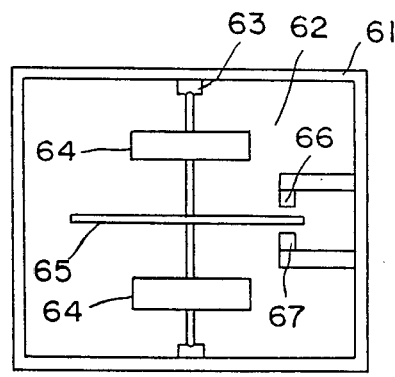
FIGS. 20(A), (B) are views showing an example of an azimuth compass used in the present invention.
Figure 20:
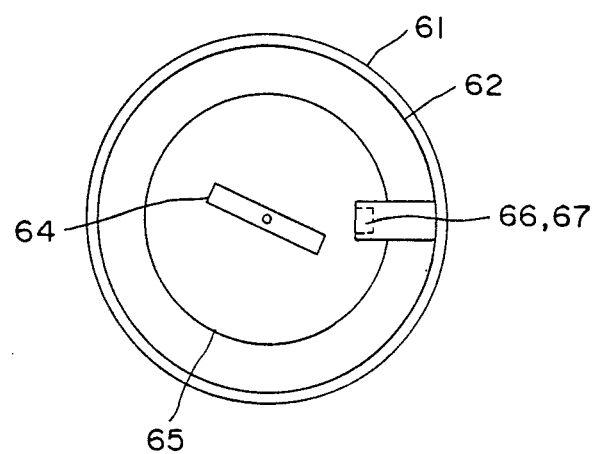

The position sensing section is provided with an azimuth compass 23 and dipmeter 25 as means for measuring curvature, and with a rotation meter 24 as means for measuring the orientation of the optical head. The azimuth compass 23 is attached to the sonde 11 at first fulcrums A, A'. The azimuthcompass 23 can be freely rotated at these first fulcrums A, A' about an axis 1, which coincides with the axial direction of the sonde 11, and at second fulcrums Q, Q' about an axis m, which lies perpendicular to the axis 1. The axis 1, m are indicated by the broken lines in FIG. 12. This arrangement allows the observation section to be supported in a state that does not change with respect to the vertical direction from aboveground. The detailed construction of the azimuth compass is illustrated in FIG. 20, in which it is seen that the azimuth compass has an internal magnet for measuring the downdip angle of the sonde 11, as will be described below.

The dipmeter 25 likewise has fulcrums R, R' at which the dipmeter can be freely rotated about the axis 1, and is attached to the sonde 11 at fulcrums B, B'. Thus the arrangement is such that the observation section can be rotated about the axis 1 to correspond to the inclination of the sonde 11. The detailed construction of the azimuth compass is illustrated in FIG. 21, in which it is seen that the azimuth compass has an internal weight for measuring the dip of the sonde 11. The rotation meter 24 is provided at the position of the fulcrum A, where the azimuth compass 23 is attached, and measures a reference direction E of the sonde 11.

Figure 13:
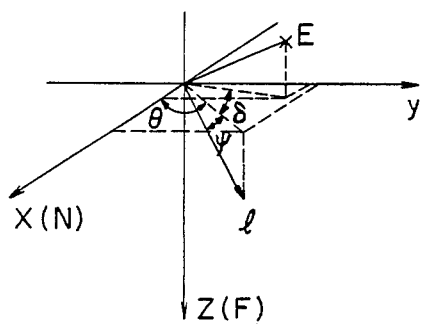
FIG. 13 is a view useful in describing angles sensed by an azimuth compass and dipmeter.

FIG. 13 illustrates a three-dimensional coordinate system having x, y and z axes. Let the x axis be aligned in the north-south direction, the y axis in the east-west direction and the z axis in the direction of the earth's gravitational force. In such case an azimuth angle $\theta$ represents azimuth from north, and an inclination angle $\phi$ represents inclination from a horizontal plane. With the sonde shown in FIG. 12, the azimuth angle $\theta$ illustrated in FIG. 13 is obtained from the downdip angle indicated by the azimuth compass 23, and the dip $\phi$ depicted in FIG. 13 is obtained from the dip indicated by the dipmeter 25. Accordingly, let a reference point E shown in FIG. 12 be aligned with north azimuth and let this serve as a reference azimuth, and let the azimuth angle $\theta$ and dip $\phi$ both be zero when the azimuth compass 23 and dipmeter 25 are in the states shown in FIG. 12. Then, if the bore hole is inclined from the state shown in FIG. 12 at an angle of, say, $\alpha$ in the direction of north azimuth, the azimuth angle $\theta$ will be 0, the dip $\phi$ will be $\alpha$, and the angle of rotation $\delta$ will be zero. However, in a case where the bore hole is inclined at the angle $\alpha$ in the direction of west azimuth, the azimuthcompass 23 and dipmeter 25 rotate 90° counterclockwise about the axis 1. Consequently, the azimuth and dip angles $\theta$, $\phi$ become $-90°$ and $\alpha$, respectively. The angle of rotation $\delta$ measured by the rotation meter 24 also becomes 90°. If the sonde is rotated (twisted) 90° in the west direction, the azimuth angle $\theta$ and dip angle $\phi$ do not change. Only the rotation angle $\delta$ measured by the rotation meter 24 changes, this becoming 0°. Thus, the curvature of the bore hole is measured by the azimuth compass 23 and dipmeter 25, and the orientation of the sonde is measured by the rotation meter 24. For a case where measurement is performed by a scanner, the direction in which the optical head 16 (the scanner head) is pointing can be determined by the amount of rotation (the output of the direction finder 13) from the reference position E, which is set within the sonde. The rotation meter 24 is for measuring the orientation of the sonde reference position E in order to obtain the orientation of the optical head 16, which depends upon the twisting of the rotation meter. More specifically, the orientation of the reference position E of sonde 11 can be obtained by adding the angle of rotation $\delta$ measured by the rotation meter 24 to the azimuth angle $\theta$ measured by the azimuth compass 23. On the other hand, the direction finder 13 of the scanner section is for measuring the direction in which of the optical head 16 (scanner head) deviates from the reference position E of the sonde 11. Therefore, by correcting the orientation of the optical head 16 by this measured value, it is possible to obtain the observed position in the scanning data provided by the photoelectric transducer 18. The observed position of the scanning data can be calculated in the form of an accurate value by using a predetermined calculation formula based on data indicative of the positional coordinates of the rotational center of the optical head 16, the orientation of the head, the bore hole diameter and the bore hole inclination.

Figure 14:
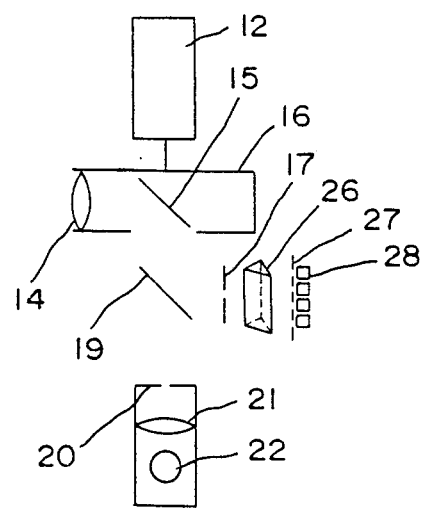
FIGS. 14(A), (B) are views illustrating exemplary constructions of multiple spectrum scanners.
Figure 14:
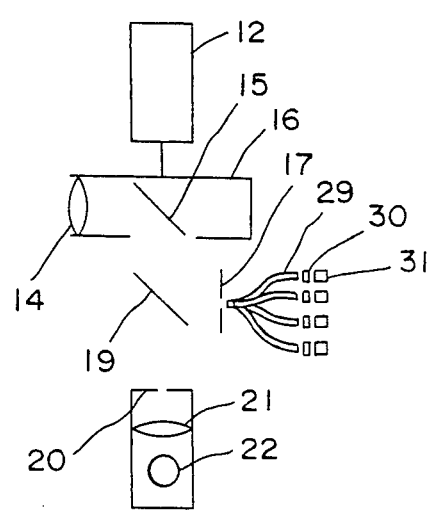
Figure 15:
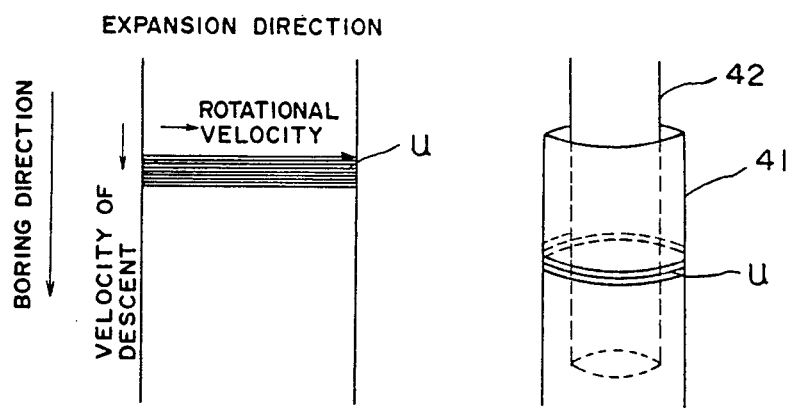
FIGS. 15(A), (B) are views illustrating paths on the developed surface of a hole wall scanned by a light beam.

FIG. 14 illustrates an exemplary construction of a multiple spectrum scanner in which wavelength regions are selected and a reflected light beam is measured for each and every wavelength region by a plurality of photoelectric transducers. In the arrangement of FIGS. 14(A), a prism 26 is arranged on the light exit side of the light-receiving slit 17 to separate entrant light into its spectral components, and a wavelength selection slit 27 is disposed on the light exit side of the prism 26 to select the wavelength regions. The intensity of the separated light radiation of each wavelength region is measured by a photoelectric transducer 28 arranged on the light exit side of the slit 27. Accordingly, if the slit 17 is disposed in the three regions red, blue and green, by way of example, then a color picture can be obtained by combining the separated light radiation intensities of these three colors on the screen of a color television monitor. In addition, a luminance picture of the infrared region can be obtained by measuring the separated light radiation intensity of the infrared region. In the arrangement depicted in FIGS. 14(B), the light input ends of optical fibers 29 are disposed to oppose the light exit side of the light-receiving slit 17 so that a beam of light reflected from the bore hole wall surface will enter said input ends upon passing through the slit 17. The light output ends of the optical fibers 29 are separated from one another and a filter 30, such as a band-pass filter or cut-off filter, is arranged at each output end. This arrangement makes it possible to select each wave length region. A photoelectric transducer 31 is arranged at the output end of each filter 30.

In the above arrangement, the light beam is produced by the light source 22 and is projected toward the bore hole wall surface while being moved depthwise of the bore hole and swiveled by the swiveling motor 12. The light beam reflected from the bore hole wall surface is converted into an electric signal by the photoelectric transducer 18 to provide picture information indicative of the bore hole wall. This information is sent to a data processing control unit. The latter includes e.g. a microprocessor and a memory and is for controlling the swiveling motor 12 and light source 22 and for processing the electric signal from the photoelectric transducer 18. The processing performed includes storing the electric signal as picture information in the memory, outputting, by way of a picture processor, a hard copy of an expanded picture continuous depthwise of the bore hole, and outputting, by means of an output device such as a printer or monitor television, the expanded picture as well as other necessary information. In order to produce an output of the hard copy of an expanded picture continuous depthwise of the bore hole, the picture processor is constructed as shown in FIG. 16, which serves as one example.

Figure 16:
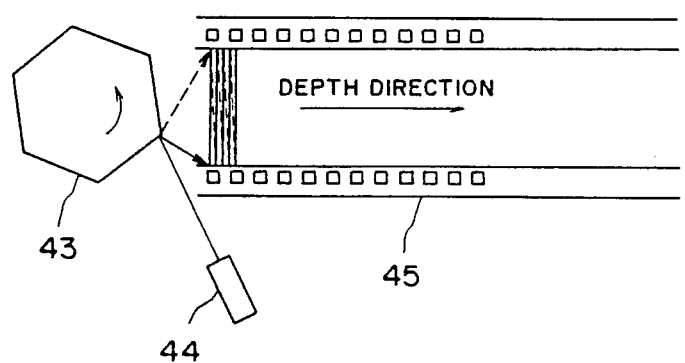
FIG. 16 is a view useful in describing an embodiment in which a hard copy of a bore hole wall surface is obtained using a bore hole scanner according to the present invention.

With reference to FIG. 16, a light source 44 has its luminance controlled based on the electric signals obtained from the photoelectric transducer shown in FIG. 12. The electric signals may be used as such in the form received from the photoelectric transducer. Alternatively, the signals may be stored temporarily in memory and then used upon being read out of the memory in accordance with the scanning sequence. A prism 43 is used as a reflector having the shape of polygonal prism. Light from the light source 44 is reflected by the prism 43 so as to shine on a film 45. When the prism 43 is rotated in the direction of the arrow, as shown in FIG. 16, the reflected light from the light source 44 is made to repeatedly scan across the film 45 six times (assuming that the prism 43 is hexagonal in shape) per revolution of the prism in a direction at right angles to the longitudinal direction of the film. Accordingly, if the rotational speed of the prism 43 and the swiveling speed of the motor 12 (FIG. 12) are synchronized, the film 45 is moved in coordination with the depthwise movement of the sonde and the luminance of the light source 44 is controlled based on electric signals from the photoelectric transducer, then a hard copy of an expanded picture of the bore hole wall, which picture is continuous in the depth direction of the bore hole, will be obtained on the film 45. If the electric signals obtained from the photoelectric transducer are not merely luminance (brightness) signals but signals employing the luminance of the three colors red, blue and green, then modulation based on these signals can of course be performed even with the light source 44, thereby enabling a hard copy to be obtained in color.

A system illustrated in FIG. 17 will now be described. The system of FIG. 17 includes an azimuth compass 52, a dipmeter 53 and a depth gauge 55. The latter is provided on an above-ground controller for controlling the length of a cable CL paid out and is adapted to sense the paid-out length of the cable CL. The azimuth compass 52, dipmeter 53 and depth gauge 55 are connected to a first arithmetic unit 56. When the paid-out length of the cable CL attains a unit length, the first arithmetic unit 56 reads in the azimuth angle $\theta$ and inclination angle $\phi$ from the azimuth compass 52 and dipmeter 53, respectively, and proceeds to calculate the paid-out length of the cable CL in terms of components $\Delta x$, $\Delta y$, $\Delta z$ corresponding to the coordinate space shown in FIG. 13. The calculation is based on the paid-out length $\Delta L$ of the cable CL, the azimuth angle $\theta$ and dip $\phi$. The length components are expressed as follows:

$$\Delta x = \Delta L \cos \phi \cos \theta$$

$$\Delta y = \Delta L \cos \phi \sin \theta$$

$$\Delta z = \Delta L \sin \phi$$

The output of the first arithmetic unit 56 is applied to a second arithmetic unit 57, which reads sonde position coordinates $X_i$, $Y_i$, $Z_i$ out of a memory 58, these coordinates having been obtained by preceding integration of $\Delta x$, $\Delta y$, $\Delta z$. To these coordinate values the second arithmetic unit 57 adds paid-out lengths $\Delta x$, $\Delta y$, $\Delta z$ calculated by the arithmetic unit 56 to calculate the present position coordinates $X_{i+1}$, $Y_{i+1}$, $Z_{i+1}$ of the sonde. These coordinates are expressed as follows:

$$X_{i+1} = X_i + \Delta x$$

$$Y_{i+1} = Y_i + \Delta y$$

$$Z_{i+1} = Z_i + \Delta z$$

Accordingly, let the entrance to the bore hole have coordinates (0,0,0), and let a point A, which is 10 m to the north, 30 m to the west and 50 m undergound have coordinates of (10,30,50), by way of example. If the sonde is moved from this position in a direction $\theta = 0$, $\phi = 30°$ by paying out 10 m of the cable, then the amount of positional change will be $$\Delta x = 10 \times \cos 30° \cos \theta = 8.7$$

$$\Delta y = 10 \times \cos 30° \sin \theta = 0$$

$$\Delta z = 10 \times \sin 30° = 5$$

Therefore, the present position of the sonde will be expressed as follows:

$$X_{i+1} = 10 + 8.7 = 18.7$$

$$Y_{i+1} = 30 + 0 = 30$$

$$Z_{i+1} = 50 + 5 = 55$$

Thus, the sonde will be located at a position 18.7 m to the north, 30 m to the west and 55 m underground.

Figure 17:
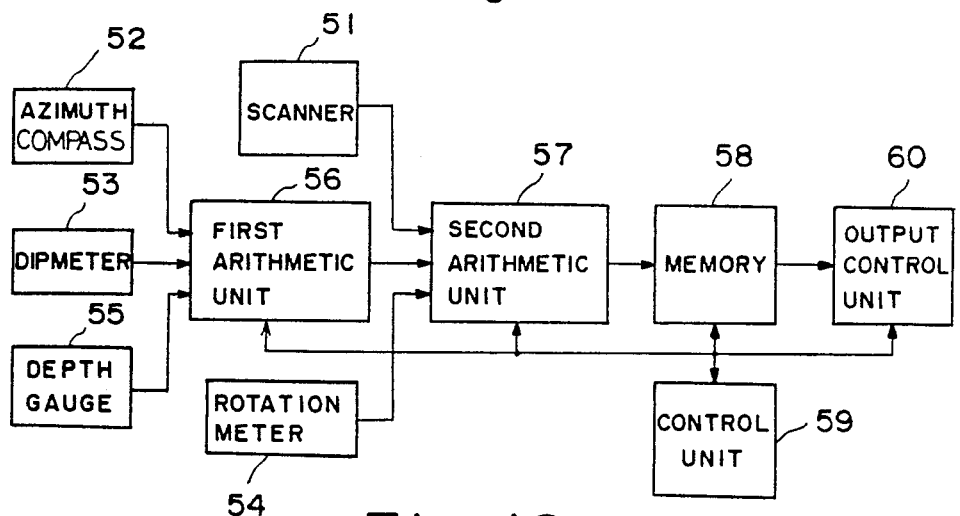
FIG. 17 is a block diagram illustrating the construction of a system embodying the present invention.

The system of FIG. 17 further includes a scanner section 51 and a rotation meter 54, which supply the second arithmetic unit 57 with scanning data and a signal indicative of the rotational angle of the sonde, respectively. The second arithmetic unit 57 calculates the observed position based on the scanning data, the sonde rotational angle, and the sonde position obtained by the above-described calculations, and stores these data in the memory 58.

Figure 18:
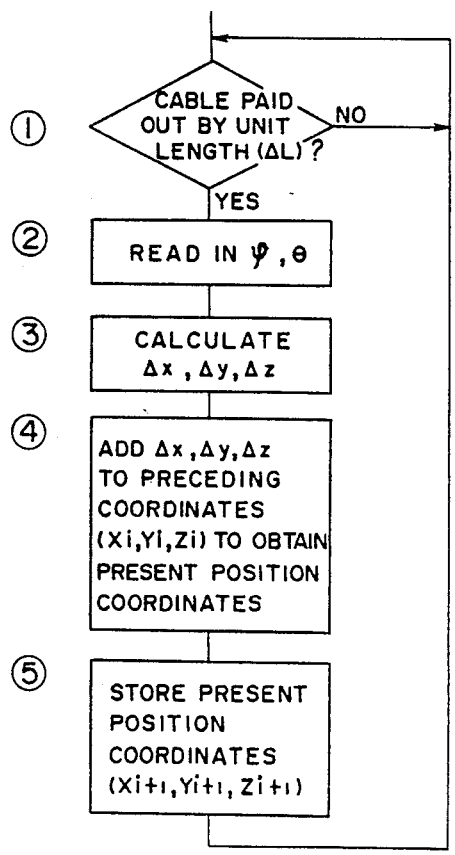
FIG. 18 is a flowchart useful in describing processing executed by the system of FIG. 17.

The memory 58 stores the sonde position coordihates X, Y, Z, calculated by the second arithmetic unit 57, in time-series fashion and also stores the corresponding sonde orientations, scanning data and observation positions. FIG. 18 shows a flowchart of processing up to the step at which the sonde position coordinates X, Y, Z are stored in memory 58. The system of FIG. 17 further includes an output control unit 60 and a controller 59 for executing overall control, inclusive of the arithmetic units 56, 57, memory 58 and output control unit 60. Based on the position coordinates X, Y, Z stored in memory 58, the output control unit 60 delivers data to an output unit (not shown) such as a CRT display or XY plotter to describe the trajectory of the sonde on the display screen or plotter, and also outputs scanning data to obtain a hard copy. As mentioned earlier, the hard copy of the scanning data is produced by lumininance modulating the scanning data and obtaining a print of the results on film.

In this case, data indicative of the run and dip of the cracks and bed formation obtained in an obliquely curving boring hole or horizontal boring hole can be obtained by applying a correction to data indicative of the orientation of the boring hole.

Figure 19:
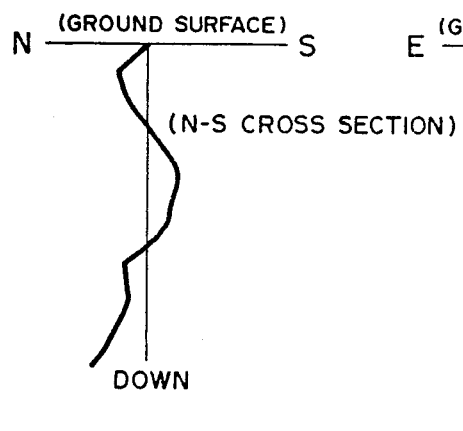
FIGS. 19(A), (B), (C), (D) are views showing examples of display outputs of measurement data indicative of bore hole curvature.
Figure 19:
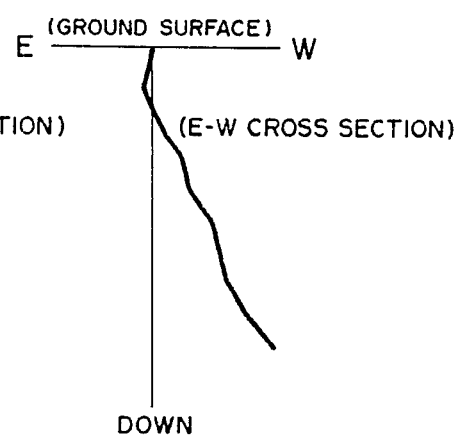
Figure 19:
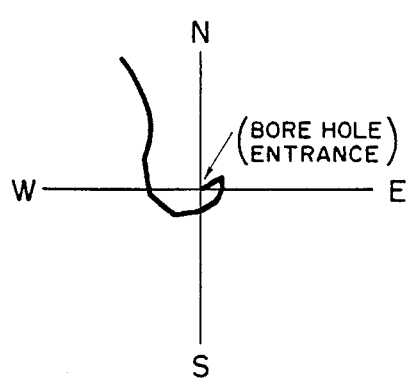
Figure 19:
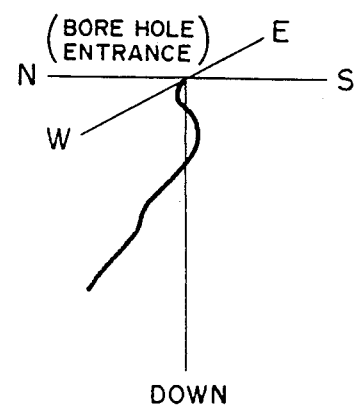

FIG. 19(A) illustrates an example of a sonde trajectory in a north-south cross-section. FIG. 19(B) illustrates an example of a sonde trajectory in an east-west cross-section. FIG. 19(C) shows an example of a sonde trajectory in a plane viewed from above. FIG. 19(D) shows an example of a sonde trajectory in three dimensions.

Examples of the azimuth compass and dipmeter will now be described.

In the azimuth compass shown in FIG. 20, a specific gravity liquid 62 is sealed within a case 61. The liquid 62 is a transparent liquid, such as silicone oil, of a type that will result in approximately zero weight upon a bearing 63 of a movable member comprising a magnet 64 and an encoder disk 65. By axially supporting the movable element in the specific gravity liquid via the bearing 63, gravity is compensated for owing to the buoyancy of the specific gravity liquid 62 and rotational moment of inertia is compensated for by the viscosity of the liquid, thus enabling the magnet 64 to move smoothly so that the direction will always be that of north azimuth. A light-emitting element 67 and a light-receiving element 66 are arranged to oppose each other across the encoder disk 65, which rotates in unison with the magnet 64. Light from the element 67 is projected toward the encoder disk 65 and is received by the element 66, thus enabling azimuth to be determined. For example, by letting the position of the encoder disk 65 when the sonde observation azimuth is aligned with north azimuth be taken as a reference, the rotational angle of the encoder disk 65 may be obtained based on a signal from the light-receiving element 66 when the sonde observation position changes and the case 61 rotates in accordance with this displacement. Displacement from north azimuth may thus be determined.

FIG. 21 is a view showing an example of the manner in which the azimuth compass of FIG. 20 is mounted. In FIG. 21, the case 61 is connected via fulcrums A, A', Q, Q', about which the case is freely rotatable, and is attached to the sonde at the fulcrums A, A', as described earlier. It is arranged so that a line connecting the fulcrums A, A' will assume a vertical attitude (i.e. will coincide with the direction of the sonde axis) in a state where the sonde it pointing straight down. Accordingly, even if the inclination of the sonde is changed to alter the inclination of the line connecting the fulcrums A, A', the attitude of the case 61 will not change and the encoder disk 65 will be maintained in a horizontal state, thereby providing highly accurate measurement precision. Further, if rotational movement occurs on the line connecting the fulcrums A, A' in a state where the sonde axis remains pointing straight down or straight up, the output will be indefinite but the horizontal component of the sonde direction in this case will be zero. Hence, no output from the azimuth compass 23 will be necessary.

Furthermore, it is permissible to use a magnet having biaxial gyro balance as the above magnet.

In the dipmeter shown in FIG. 22, a float 74 and a weight 78 are attached to an encoder disk 75. The encoder disk 75 is axially supported in a vertical attitude within a case 71 by a bearing 73 in such a manner that the side of the disk to which the weight 78 is attached always faces downward. FIG. 22(B) represents a side view (sectional view) of FIG. 22(A). If the dipmeter is tilted to the left or right from the state shown, the positions of a light-emitting element 77 and light-receiving element 76 on the encoder disk 75 change. Inclination is measured by sensing the amount of this change. An example of a manner of mounting this dipmeter is illustrated in FIG. 23, in which the case 71 is connected via fulcrums R, R', about which the case is freely rotatable, and fixed to the sonde at stationary points B, B', as set forth earlier. It is arranged so that a line connecting the stationary points B, B' will assume a vertical attitude (i.e. will coincide with the direction of the sonde axis) in a state where the sonde it pointing straight down. Accordingly, regardless of the direction in which the sonde is inclined, such inclination will be accompanied by rotation of the case 71 about an axis that is the line connecting the points B, B' and the encoder disk 75 will always be maintained in a vertical attitude, thereby providing highly accurate measurement precision. Thus, the dipmeter is supported so that it will not tilt in the left-right direction of FIG. 22(A) but only in the left-right direction of FIG. 22(B).

Let us now describe embodiments of a bore hole depth measurement system according to the present invention.

In the embodiment of FIG. 24(A), an induction wire (or an optical fiber or ultrasonic wire) for depth measurement is provided within a cable. The system includes a signal transmission time calculating device 86 for calculating the amount of stretch of the cable within a bore hole 81. By providing the cable with marks for cable length measurement, the amount of cable stretch within the bore hole 81 is calculated and cable length is corrected to enable accurate measurement of depth.

In FIG. 24(A), the signal transmission time measuring unit 86 emits an electric pulse signal (or a light signal or ultrasonic signal), which is reflected in the vicinity of a sonde 82, and senses the reflected signal, thereby measuring the round-trip transmission time and calculating the length by which the cable stretches in a bore hole 81.

Accordingly, the length of the cable within the bore hole 81 is measured by equidistant marks provided on the cable in advance, and this length is corrected by the signal transmission time measuring unit 86 on the basis of the calculated stretch distance, thus enabling the correct depth of the sonde 82 to be obtained.

In the arrangement shown in FIG. 24(B), a time differential measuring unit 87, an induced electromagnetic wave sensor 88 and a signal transmitter 89 are used to measure the round-distance transmission time of a signal transmitted through a cable in the bore hole 81, just as in the arrangement of FIG. 24(A), whereby the depth of the sonde 82 is measured.

The signal transmitter 89 in FIG. 24(B) transmits an electric pulse signal to the sonde 82 through the cable. The induced electromagnetic wave sensor 88 senses an electromagnetic wave generated by the electric pulse signal that passes through the interior of the cable. The time differential measuring unit 87 measures the time difference between electromagnetic waves sensed by the sensor 88 and calculates distance from the measured value. More specifically, when the signal transmitter 89 transmits the electric signal pulse to the sonde 82, the electromagnetic waves are sensed by the induced electromagnetic wave sensor 88 at the time of transmission and at the time the pulse signal returns due to reflection. The time differential measuring unit 87 then measures the round-trip transmission time of the electric pulse signal from the sensor 88 to the sonde 82 and calculates depth from the sensor 88 to the sonde 82 based on this round-trip transmission time.

Theoretically, since the transmission time is not determined by the cable stretch itself but by the length of the cable including the stretch thereof, cable length inclusive of stretch can be measured. As a result, depth can be measured in an accurate manner. More specifically, with regard to the cross section of a coaxial cable, let a represent the radius of the core, b the radius of the dielectric and $\epsilon$ the dielectric constant. When cable length grows from l to l+$\Delta$l, the following equation will hold:

$$2\pi a^2 l = 2\pi a'^2 (l + \Delta l)$$

$$\therefore a' = \sqrt{\frac{l}{l + \Delta l}} \cdot a$$

Likewise, $$b' = \sqrt{\frac{l}{l + \Delta l}} \cdot b$$

where a' represents the radius of the core when the cable has stretched and b' the radius of the dielectric when the cable has stretched. Since the electrical constants L and C of a coaxial cable are as follows:

$L = 0.4593 \log_{10}(b/a)$
$C = 24.13 \; \epsilon/\log_{10}(b/a)$ these constants are decided by b/a. Accordingly, (dielectric radius)/(core radius) when a cable of length l stretches by $\Delta$l is given by the following:

$$\frac{b'}{a'} = \frac{\sqrt{\frac{l}{l + \Delta l}} \cdot b}{\sqrt{\frac{l}{l + \Delta l}} \cdot a} = \frac{b}{a}$$

Thus, the electrical constants L, C do not change. Accordingly, the propagation velocity v does not change even if the cable stretches. In other words, if a 990 m cable stretches to a length of 1000 m, the propagation delay time observed will be that for a 1000 m cable.

In the arrangement shown in FIGS. 24(C), a sonic transmitter 90, a sonic sensor 91, a sonic transmission start signal generator and a sonic transmission time measuring unit 93 are used to measure sonic transmission time through water filling a bore hole 81 so that the depth to the vicinity of a sonde 82 may be calculated.

In FIG. 24(C), the sonic transmitter 90 is provided directly above the sonde 82 and starts emitting sound waves in response to an electric signal received from the sonic transmission start signal generator 92. The sonic sensor 91 is disposed at the entrance to the bore hole 81 in order to sense the sound waves emitted by the sonic transmitter 90. The sonic transmission time measuring unit 93 measures the sound wave propagation time from transmission of the electric signal to the sonic transmitter 90 by the sonic transmission start signal generating unit 92, namely from emission of the sound wave by the sonic transmitter 90, which is started by the electric signal, to detection of the sound wave by the sonic sensor 91, and calculates depth down to vicinity of the sonde 82 based on the measured value of propagation time.

Figure 24:
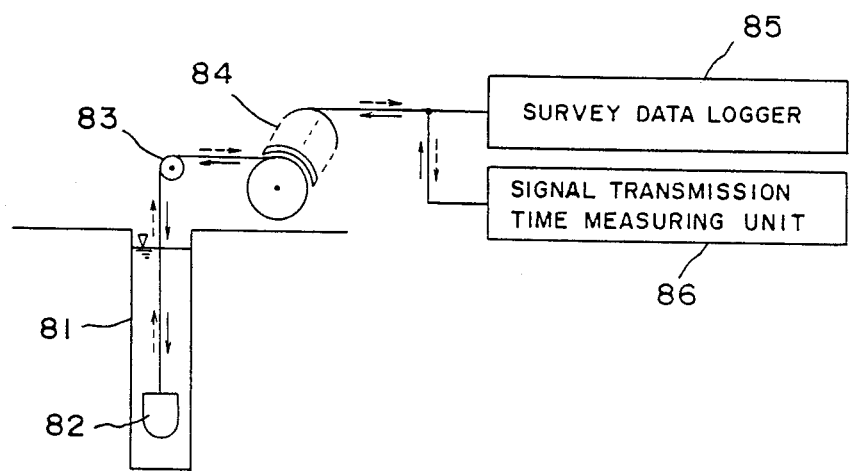
FIGS. 24 (A), (B), (C) are views illustrating examples of systems for measuring bore hole depth.
Figure 24:
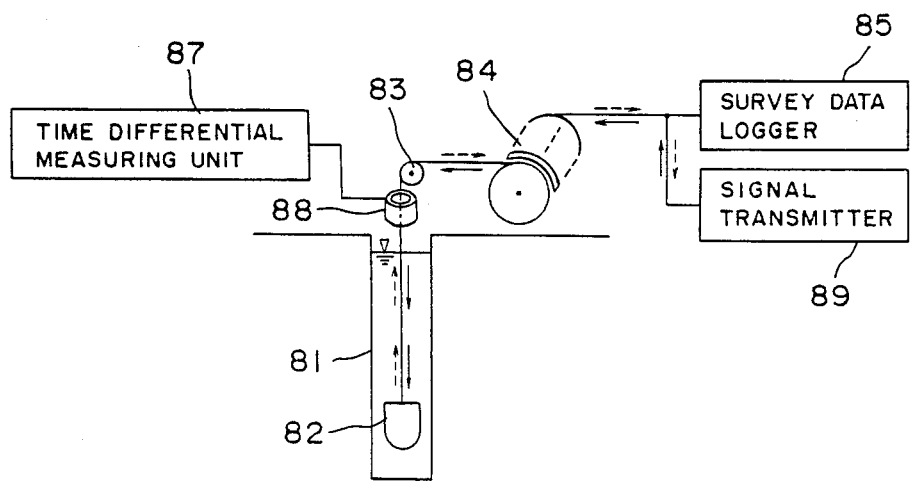
Figure 24:
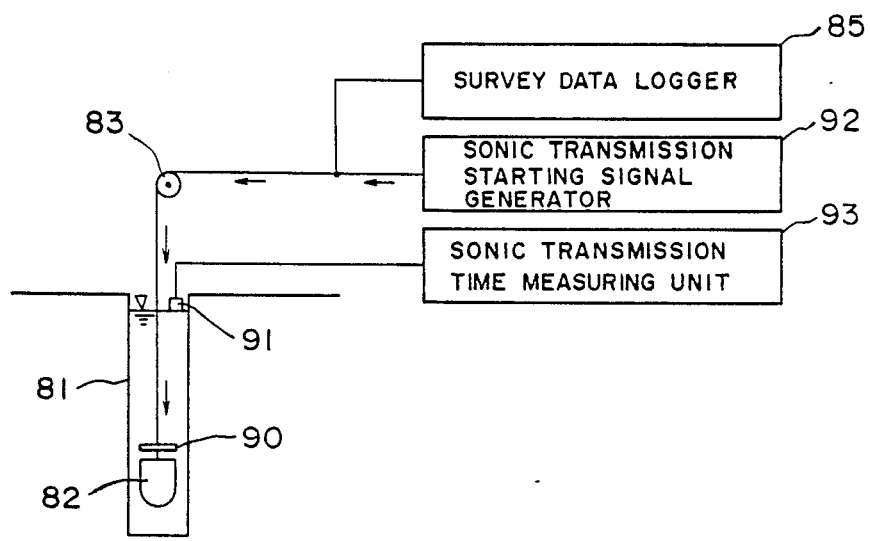

It goes without saying that the present invention is not limited to the arrangements shown in FIG. 24 but can be modified in various ways in terms of the type of signal, the construction of the means for signal processing, signal generation and detection, and in other aspects as well.

Furthermore, the invention is not limited to the arrangement in which light from the light source is projected directly toward the bore hole wall surface, as shown in FIG. 4, or to the arrangement in which a half-mirror and reflector are used in combination, as depicted in FIG. 12. It is permissible in FIG. 12 to delete the half-mirror, shift the light projection angle of the optical head 16 up and down directly from the side and provide the light-receiving element above or below the optical head 16.

According to the present invention as described above, the wall surface of a bore hole can be observed based on objectively determined color tones and an expanded picture of the wall surface can be outputted in a simple manner. In addition, observation points can be calculated upon sensing downdip angle, angle of dip and cable length. This makes it possible to ascertain observed position and depth accurately even in a curving bore hole. Moreover, since the orientation of a scanner head is calculated by sensing rotation of a sonde within a bore hole, the observation azimuth and depth of scanning data can be accurately grasped. Further, observation based on a horizontal picture can be carried out in accordance with the observed position associated with each item of scanning data even in an inclined bore hole, and bore hole wall observation based on accurately determined positions can be performed continuously to enable observation of oblique faults and the like within an inclined bore hole. Since the depth of the sonde is measured by measuring the propagation time of electric, optical or sonic signals, the depth of a sonde lowered to depths in the 1000 m class can be measured accurately without relation to stretching of the cable supporting the sonde.

As many apparently widely different embodiments of the present invention can be made without departing from the spirit and scope thereof, it is to be understood that the invention is not limited to the specific embodiments thereof except as defined in the appended claims.

What we claim is:

1. A method of observing a wall in a bore hole by using a sonde supported for movement up or down within the bore hole, comprising the steps of:

providing a light source within the sonde;

projecting a beam of light toward the bore hole wall from said light source within the sonde;

measuring the position of the sonde relative to the bore hole wall irradiated by the beam of light;

receiving and separating light reflected from the bore hole wall into spectra, and converting the spectra into electric signals, and repeating said steps of projecting said beam of light on adjacent portions of said bore hole wall, receiving and separating light reflected from said adjacent portions of said bore hole wall into spectra and converting said spectra into electric signals while measuring the position of the sonde relative to each said adjacent port ion of said bore hole wall, correlating the electric signals indicative of said light spectra at said adjacent portions of said bore hole wall with the position of said sonde relative to each said adjacent portion of said bore hole wall, and providing an integrated display indicative of said light spectra detected at each of said adjacent portions of said bore hole wall.

2. The method according to claim 1, wherein said step of measuring the position of the sonde relative to the bore hole wall includes the steps of measuring the distance the sonde is moved up and down, inclination of the sonde, rotational orientation of the sonde and angle of the light beam projection relative to the sonde, and calculating the position of the sonde relative to the bore hole wall based on these measured quantities.

3. The methodd according to claim 2, wherein the step of measuring the distance the sonde is moved up and doww includes the steps of:

transmitting a signal toward the sonde from an entrance to the bore hole;

receiving the signal following its return from the sonde;

measuring signal propagation time from transmission of the signal to return of the signal; and calculating the distance from the bore hole entrance to the sonde based on said measured signal propagation time.

4. The method according to claim 2, wherein the step of measuring the distance the sonde is moved up and down includes the steps of:

measuring round-trip propagation time of a signal over the entire length of a cable, from which the sonde is suspended, in a state where the cable has been lowered into the bore hole and a state where the cable has been fully taken up;

calculating a length by which the cable stretches within the bore hole based on a difference between the two round-trip propagation times measured under the abovementioned states; and correcting, based on the calculated length by which the cable stretches, the distance the sonde is moved up and down, which distance is measured on the basis of a paid-out length of the cable.

5. The method according to claim 2, wherein the step of measuring the distance the sonde is moved up and down includes the steps of:

passing an electric pulse signal through a cable from which the sonde is suspended;

sensing, at an entrance to the bore hole, an electromagnetic wave generated by the electric pulse signal;

measuring, based on detection of the electromagnetic wave, round-trip propagation time of the electric pulse signal from the entrance to the bore hole to the sonde; and calculating, based on the measured round-trip propagation time, the distance the sonde is moved up and down.

6. The method according to claim 2, wherein the sonde is provided with sonic transmission means and further including the steps of transmitting a sound wave upon receiving a signal delivered from outside the bore hole and calculating the distance the sonde is moved up and down on the basis of the time required for the sound wave to reach an entrance to the bore hole.

7. The method according to claim 1, wherein the position of the sonde relative to each portion of the bore hole wall irradiated by the beam of light is calculated by computing an amount of movement whenever a unit length of a distance the sonde is moved up and down changes, and integrating amounts of movement so computed.

8. The method according to claim 1, further including the steps of comparing said electric signals with standard values and displaying the spectral signals as specific colors.

9. The method according to claim 1, further including the steps of collecting survey information relative to said bore hole, correlating said spectral signs with information from said survey and proviing said spectral signals and information correlated therewith in said integrated display.

10. The method according to claim 1, wherein said integrated display is provided by:

rotating a multiple-surface mirror at a speed synchronized to the output of said electric signals indicative of said spectra;

reflecting a spectral signal at each surface of said mirror; and reproducing each reflecting spectral signal on film.

11. The method according to claim 1, wherein said integrated display includes a display of a path traversed by the sonde.

12. An appartus for observing a bore hole wall by using a sonde supported for movement up or down within the bore hole, comprising:

light projecting means for projecting a light beam toward the bore hole wall;

light processing means for receiving and separating light reflected from the bore hole wall into a spectra and converting the spectra into electric signals;

position sensing means for sensing observation positions of the sonde;

data processing control means connected to said sonde for implementing control of the movement of said sonde and said light projecting means in said bore hole and for receiving and processing said electric signals and observation position information and output means connected to said data processing control means for displaying information indicative of said light spectra and corresponding observation positions of said sonde.

13. The apparatus according to claim 12, wherein said light projecting means includes a reflector for reflecting light emitted by a light source and means for rotating said reflector to sweep the light across the bore hole wall.

14. The apparatus according to claim 12, wherein said light projecting means includes a half-mirror for transmitting light emitted by a light source and relfecting light reflected from the bore hole wall.

15. The apparatus according to claim 12, wherein said light processing means has a prism and a slit for selecting wavelength regions.

16. The apparatus according to claim 12, wherein said light processing means includes:

a plurality of optical fibers each having a light output end, the light output ends of said optical fibers being spaced apart from one another, and a filter arranged at each of said light output ends, whereby diferent wavelength regions are selected by each respective filter.

17. The apparatus according to claim 12, wherein said position sensing means comprises:
- a length sensor for sensing a length by which a cable, from which the sonde is suspended, is paid out from aboveground;
- a sonde downdip sensor;
- a sonde dip angle sensor; and
- a sonde rotational direction sensor.

18. The apparatus according to claim 17, wherein said sonde downdip sensor and said sonde dip angle sensor sense an angle of rotation by an encoder disk axially supported in a liquid having a specific gravity which renders the weight of a movable element substantially zero.

19. The apparatus according to claim 18, wherein a light-emitting element and a light-receiving element are provided so as to oppose each other across the encoder disk, whereby the angle of rotation is sensed.

20. The apparatus accoridng to claim 18, wherein said sonde dip angle sensor includes a weight attached to the encoder disk, which is freely rotatable in the vertical direction of the sonde.

21. The apparatus according to claim 18, wherein said sonde down dip sensor is comprised of a magnet fixed to said encoder disk and two sets of freely rotatable, mutually perpendicular fulcrums.

22. The apparatus according to claim 12, wherein said sonde is suspended for movement within said bore hole by a cable and said data processing control means calculates the amount of sonde displacement for each unit length of cable from which the sonde is suspended is paid out and integrates the amounts of displacement so calculated.

23. The apparatus according to claim 12, wherein said data processing control means has standard values for respective ones of said electric signals and displays specific colors upon comparing said electric signals with respective ones of said standard values.

24. The apparatus according to claim 12, wherein said data processing control means includes survey information relative to said bore hole, correlates said survey information with said electric signals, and displays said electric signals and survey information correlated therewith.

25. The apparatus according to claim 12, wherein said output means comprises:
- a film for recording an expanded picture;
- a light source modulated by a signal dependent upon spectral intensity;
- a light reflector comprised of a polygonal prism;
- means rotating said light reflector at a rotational speed which will scan light from said light source corresponding to one revolution of light projection in the bore hole in a direction at right angles to the longitudinal direction of said film at an angle of rotation for reflection from one surface of the polygonal prism; and
- means moving said film longitudinally by an amount corresponding to movement of the sonde in the depth direction of the bore hole.

* * * * *